(12) United States Patent
De France (10) Patent No.: US 8,167,665 B2
(45) Date of Patent: May 1, 2012

(54) ELECTRICAL CONNECTOR WITH COLLAPSIBLE COUPLER

(75) Inventor: Robert V. De France, Poughkeepsie, NY (US)

(73) Assignee: Hubbell Incorporated, Shelton, CT (US)

( * ) Notice: Subject to any disclaimer, the term of this patent is extended or adjusted under 35 U.S.C. 154(b) by 48 days.

(21) Appl. No.: 12/807,342

(22) Filed: Sep. 1, 2010

(65) Prior Publication Data

US 2011/0053437 A1    Mar. 3, 2011

Related U.S. Application Data

(60) Provisional application No. 61/275,841, filed on Sep. 2, 2009.

(51) Int. Cl.
*H01R 11/01* (2006.01)
*H01R 4/50* (2006.01)

(52) U.S. Cl. ....................................................... 439/783

(58) Field of Classification Search ................... 439/879, 439/783, 877
See application file for complete search history.

(56) References Cited

U.S. PATENT DOCUMENTS

| 3,156,764 A | 11/1964 | Toedtman ........................ 174/94 |
| 3,681,512 A | 8/1972 | Werner et al. ................ 174/84 R |
| 4,511,280 A | 4/1985 | Saint-Prix et al. ............. 403/274 |
| 7,575,485 B2 | 8/2009 | Waltz et al. .................... 439/783 |
| 7,708,606 B2 * | 5/2010 | Waltz et al. .................... 439/783 |
| 2003/0194916 A1 | 10/2003 | Quesnel et al. ................ 439/784 |
| 2006/0084327 A1 | 4/2006 | Chadbourne .................. 439/784 |
| 2007/0062718 A1 | 3/2007 | De France ........................ 174/84 |
| 2007/0066153 A1 | 3/2007 | De France et al. ............. 439/877 |
| 2008/0200078 A1 | 8/2008 | Waltz et al. .................... 439/783 |
| 2009/0197480 A1 | 8/2009 | Waltz et al. .................... 439/783 |

* cited by examiner

*Primary Examiner* — Javaid Nasri
(74) *Attorney, Agent, or Firm* — Harrington & Smith (57) ABSTRACT

Disclosed herein is an electrical connector. The electrical connector includes a first electrical connector member, a second electrical connector member, and an electrical connector coupler. The first electrical connector member includes a flange portion and a shaft portion. The second electrical connector member includes a pad portion and a tube portion. The tube portion is adapted to receive the shaft portion. The tube portion is adapted to be attached to another portion of the electrical connector by a crimping operation. The electrical connector coupler includes a first end, a second end, and a corrugated portion between the first end and the second end. The first end is adapted to be disposed proximate the flange portion. The second end is adapted to be disposed proximate the pad portion. The coupler is adapted to be compressed from a first length to a second length in response to the crimping operation.

30 Claims, 8 Drawing Sheets

ELECTRICAL CONNECTOR WITH COLLAPSIBLE COUPLER

CROSS REFERENCE TO RELATED APPLICATION

This application claims priority under 35 U.S.C. §119(e) to U.S. provisional patent application No. 61/275,841 filed Sep. 2, 2009 which is hereby incorporated by reference in its entirety.

BACKGROUND

1. Field of the Invention

The invention relates to an electrical connector and, more particularly, to an electrical connector with a collapsible coupler.

2. Brief Description of Prior Developments

Electrical connectors for connecting power lines/cables are known in the art. For example, U.S. Pat. Nos. 3,156,764 and 4,511,280 disclose electrical connectors having various configurations for connecting to traditional power lines/cables which generally comprise a core around which wire strands are wrapped. The electrical connectors are designed to provide reliable connections in power distribution networks.

Figure 1:
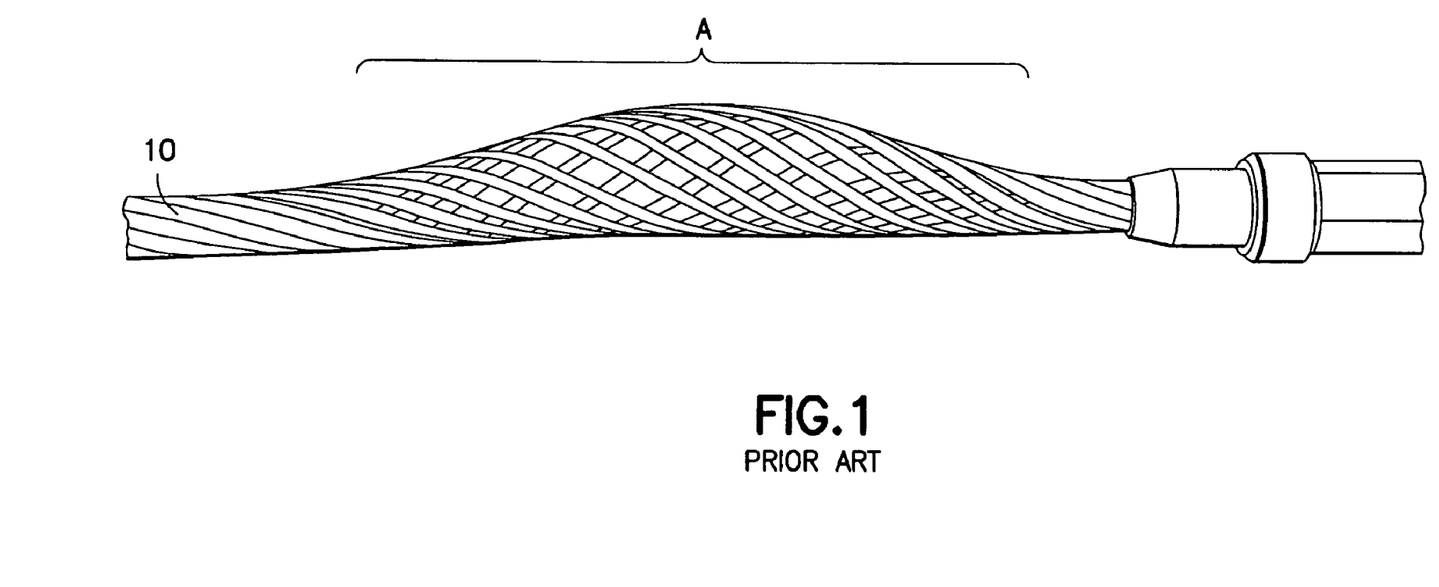
FIG. 1 is a perspective view of a conventional electrical cable connector assembly.

One drawback to the conventional configurations is that when an electrical connection is made by a crimping process (such as when the connector is sequentially crimped onto a stranded conductor), the strands can separate due to elongation of the connector. Often times, this causes a "bird caging" effect on the conductor cable, as shown in FIG. 1 (see Area A of cable 10). As maintenance and installation operations become increasingly difficult, any added time required for these operations can increase operating costs for the utility company.

Accordingly, there is a need for an electrical connector having an improved configuration for minimizing and/or preventing "bird caging" of the power line/cable.

SUMMARY

The foregoing and other problems are overcome, and other advantages are realized, by the use of the exemplary embodiments of this invention.

In accordance with one aspect of the invention, an electrical connector is disclosed. The electrical connector includes a first electrical connector member, a second electrical connector member, and an electrical connector coupler. The first electrical connector member includes a flange portion and a shaft portion. The second electrical connector member includes a pad portion and a tube portion. The tube portion is adapted to receive the shaft portion of the first electrical connector member. The tube portion is adapted to be attached to another portion of the electrical connector by a crimping operation. The electrical connector coupler includes a first end, a second end, and a corrugated portion between the first end and the second end. The first end is adapted to be disposed proximate the flange portion. The second end is adapted to be disposed proximate the pad portion. The electrical connector coupler is adapted to be compressed from a first length to a second different length in response to the crimping operation.

In accordance with another aspect of the invention, an electrical connector is disclosed. The electrical connector includes an electrical connector dead end member, an outer tube member, a wedge sleeve member, an inner tube member, and an electrical connector coupler. The electrical connector dead end member includes a looped end portion and a shaft portion. The outer tube member is located around the shaft portion of the electrical connector dead end member. The wedge sleeve member is connected to the electrical connector dead end member. The wedge sleeve is adapted to have an electrical conductor extend through at least a portion thereof. The inner tube member is adjacent the wedge sleeve member. The inner tube member is adapted to be between the electrical conductor and the outer tube member. The electrical connector coupler is between the looped end portion and the outer tube member. The electrical connector coupler includes a plurality of collapsible ribs. The plurality of collapsible ribs are adapted to collapse when the outer tube member is attached to the inner tube member.

In accordance with another aspect of the invention, a method of manufacturing an electrical connector is disclosed. A first electrical connector member having a flange portion and a shaft portion is provided. A second electrical connector member having a pad portion and a tube portion is provided. The tube portion is adapted to receive the shaft portion. The tube portion is adapted to be attached to the electrical connector by a crimping operation. An electrical connector coupler having a first end, a second end, and a corrugated portion between the first end and the second end is provided. The first end is adapted to be disposed proximate the flange portion. The second end is adapted to be disposed proximate the pad portion. The corrugated portion is adapted to collapse when the tube portion of the second electrical connector member is crimped on to the electrical connector.

In accordance with another aspect of the invention, a method of connecting an electrical connector to an electrical conductor is disclosed. A corrugated electrical connector coupler is provided on a first electrical connector member. The electrical conductor is connected to the first electrical connector member. A second electrical connector member is installed over the electrical conductor and a shaft portion of the first electrical connector member. A portion of the second electrical connector member is crimped. The corrugated electrical connector coupler is collapsed between the first electrical connector member and the second electrical connector member. The shaft portion of the first electrical connector member extends through an opening of the corrugated electrical connector coupler.

BRIEF DESCRIPTION OF THE DRAWINGS

The foregoing aspects and other features of the invention are explained in the following description, taken in connection with the accompanying drawings, wherein.

DETAILED DESCRIPTION

Figure 2:
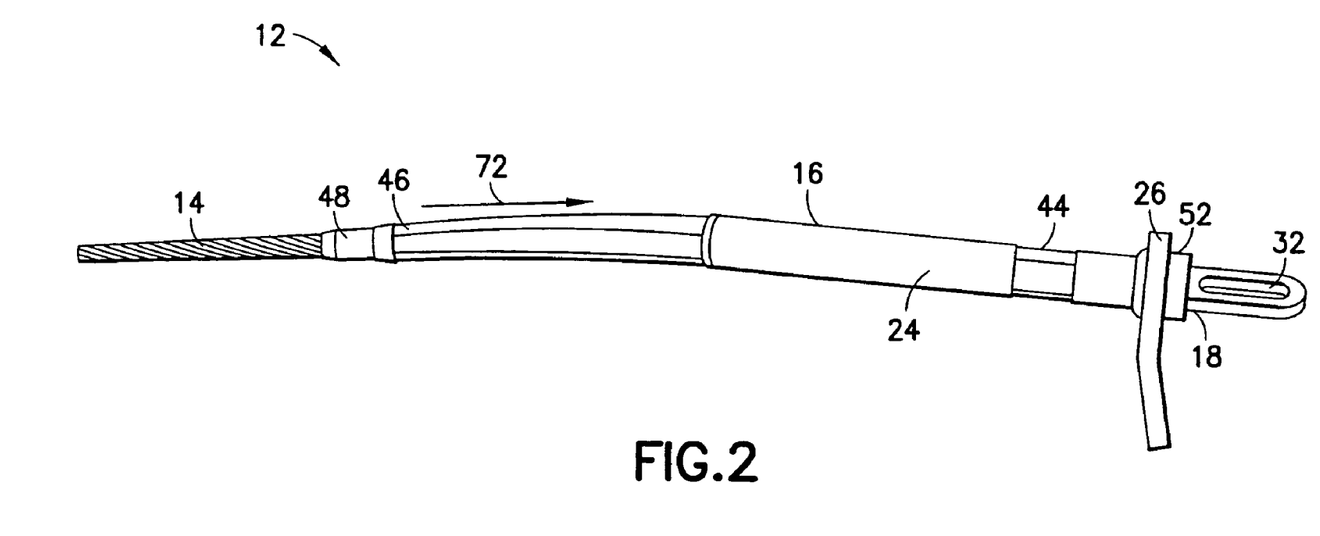
FIG. 2 is a perspective view of an electrical cable connector assembly incorporating features of the invention.

Referring to FIG. 2, there is shown a perspective view of an electrical cable connector assembly 12 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 3:
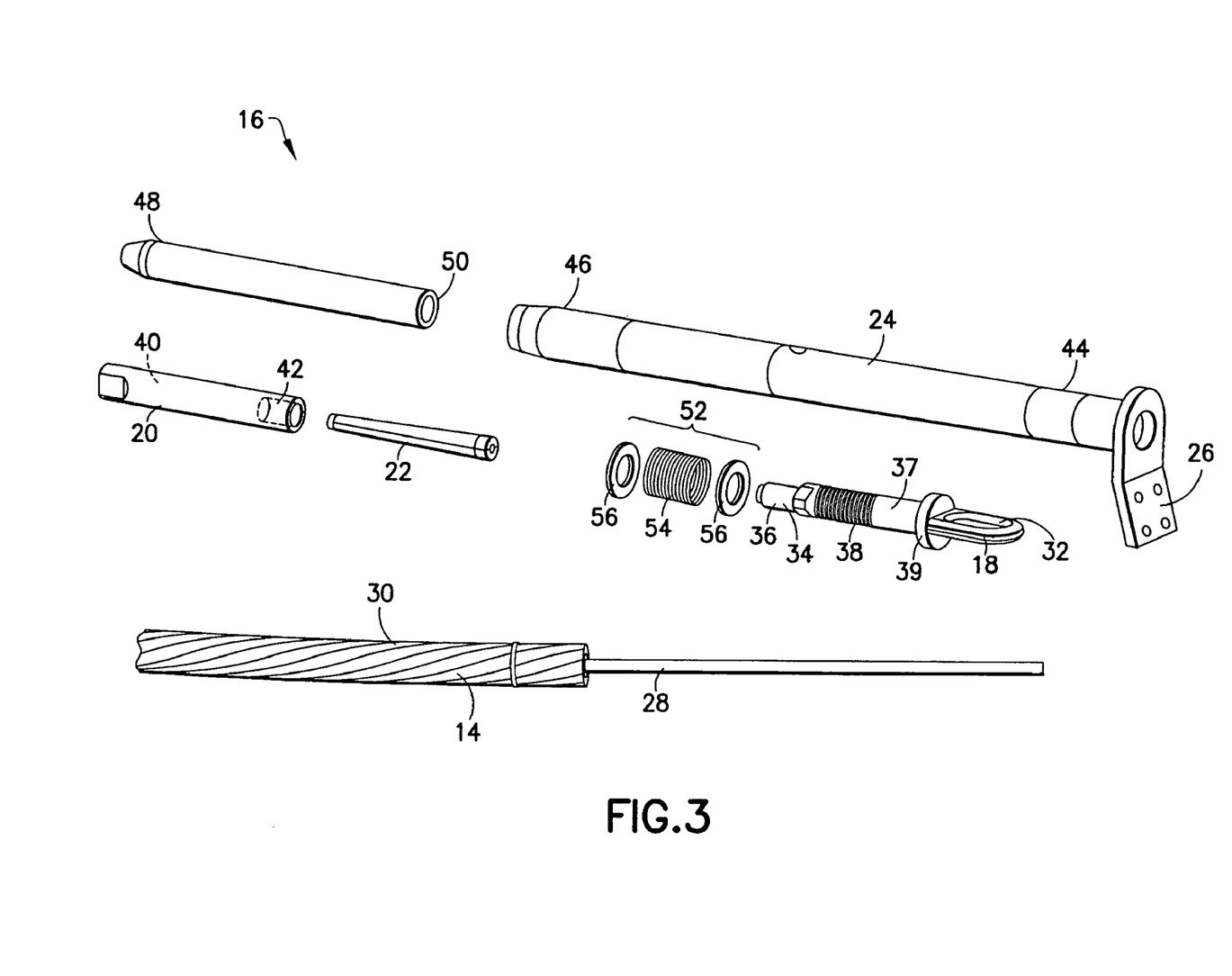
FIG. 3 is an exploded view of the electrical cable connector assembly shown in FIG. 2.
Figure 4:
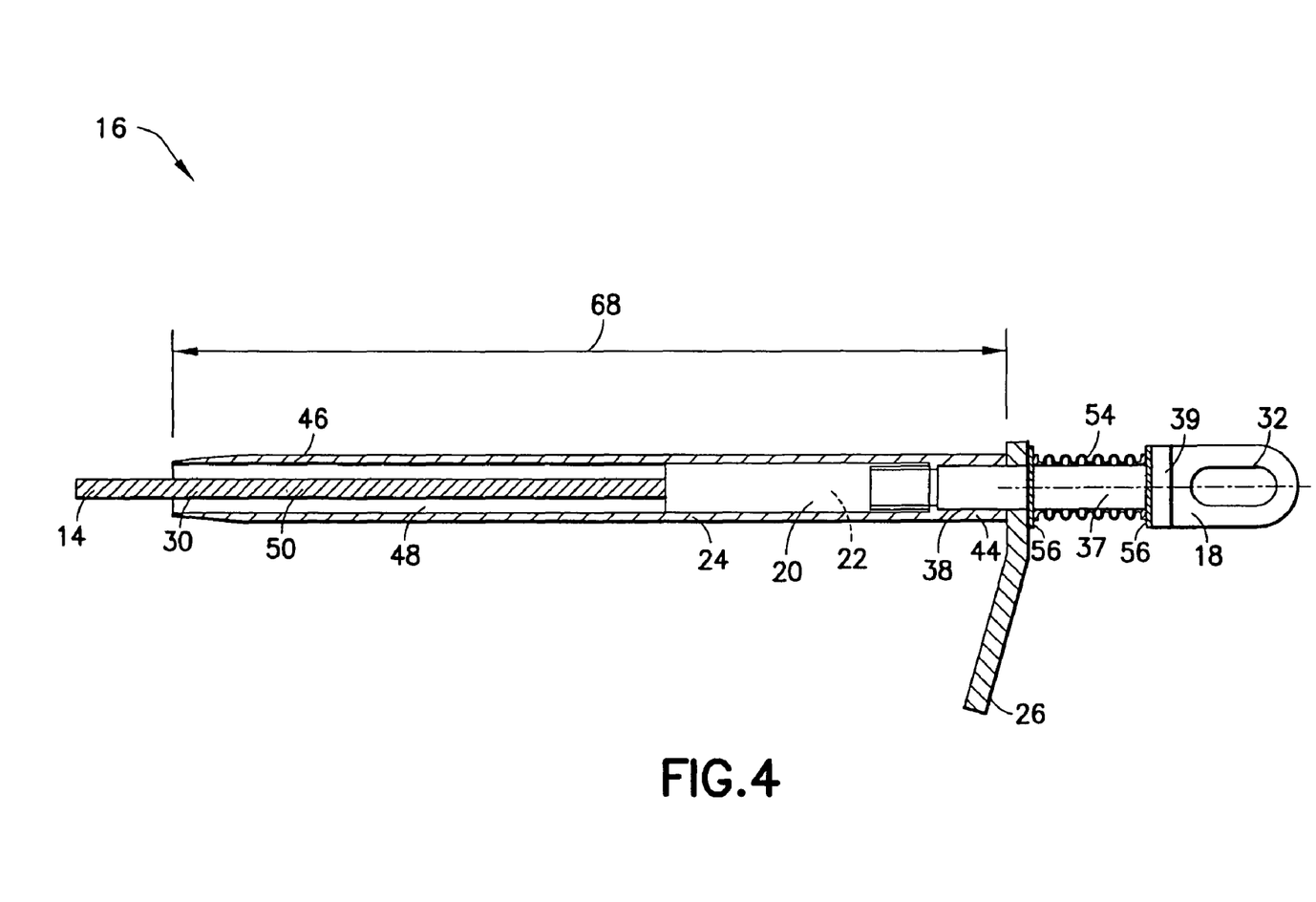
FIG. 4 is a side section view of the electrical cable connector assembly (prior to crimping) shown in FIG. 2.

The assembly 12 includes a cable 14 and an electrical connector 16. The connector 16 may be dead end connector adapted to mechanically connect an end of the cable 14 to another member, such as a transmission tower. Referring also to FIGS. 3 and 4, the connector 16 generally comprises a dead end connector member 18, a wedge sleeve member (or collet housing) 20, wedges 22 and an outer tube portion (or outer sleeve) 24. As shown in FIGS. 3 and 4 the outer sleeve 24 may comprise a pad portion (or jumper pad) 26 for electrically connecting a connector of another cable assembly to the assembly 12. However, the pad portion 26 need not be provided.

The cable 14 generally comprises a core 28 around which one or more layers (or strands) of conductor wires 30, such as made of aluminum for example, are wrapped. The connector 16 may be used with any suitable power line, such as composite core or steel core power transmission lines for example.

The dead end connector member 18 may comprise a one-piece metal member, such as steel or aluminum, having an eyelet (or looped end) 32 at a first end section and an opposite second end section 34 with a threaded section 36. The dead end connector member 18 may further comprise a ridge section (or rib section) 38. The eyelet 32 is adapted to be connected to another member, such as a transmission tower. The dead end connector member 18 may also comprise a shaft portion 37 and a flange portion 39 between the rib section 38 and the eyelet 32. The shaft portion may be proximate, or adjacent, the rib section. The flange portion 39 may be proximate the eyelet 32. However, any suitable configuration may be provided. The wedge sleeve 20 is preferably a one piece metal member, such as a steel conduit. The wedge sleeve has a general tube shape with an inner channel 40 having a threaded section 42 at a first end and may further comprise a tapered section extending away from the threaded section 42.

The wedges 22 comprise two wedges each having a general C shaped cross-section. However, in alternate embodiments, more than two wedges could be provided. As another alternate embodiment, only a single wedge might be provided which has slots forming multiple deflectable arms. The outer sides of the wedges are suitably sized and shaped to be able to slide against the inside surface of the wedge sleeve 20. The inner sides of the wedges are adapted to grip onto the exterior surface of the core 28 of the cable 14.

The outer tube portion (or outer sleeve) 24 may be made of electrically conductive metal, such as aluminum. The outer tube portion 24 has a general tube shape. The outer tube portion 24 is located around the wedge sleeve 20. A first end 44 of the outer tube portion 24 is located over the ridge section 38 of the dead end connector member 18. A second end 46 of the outer tube member 24 is located over the wires 30 of the cable 14. The pad portion 26 may also form a flange at the first end 44 of the outer sleeve 24. However, any suitable configuration may be provided.

An inner tube member (or inner sleeve) 48, which may be a one-piece member fabricated from a conductive material such as aluminum for example, may be disposed between the outer tube member 24 and the cable 14. The inner tube member 48 may be a generally tubular component that makes up the difference between the conductor cable 14 and the standard diameter outer tube member 24 of the connector 16 within a particular "family" or range of conductor sizes. The inner tube member 48 comprises an opening 50 extending along an entire length of the inner tube member 48 which is sized and shaped to accommodate the cable 14 therein.

Figure 5:
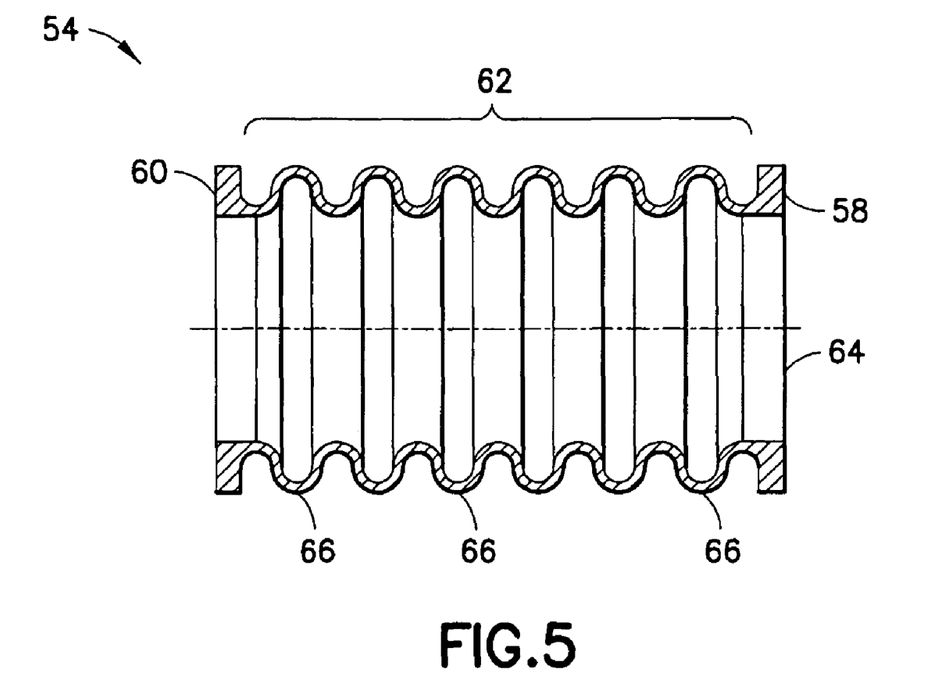
FIG. 5 is section view of a coupler used in the electrical cable connector assembly shown in FIG. 2.
Figure 6:
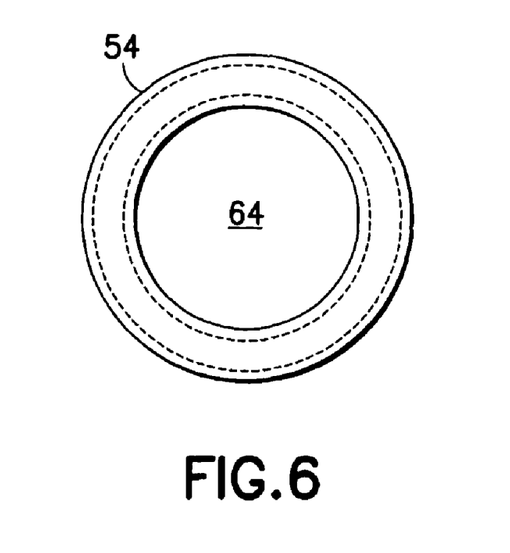
FIG. 6 is an end view of the coupler shown in FIG. 5.

An electrical connector coupler assembly 52 may be provided between the outer tube member 24 and the dead end electrical connector member 18. The coupler assembly comprises a coupler 54 and seals (or seal members) 56 at ends of the coupler 54. Referring now also to FIGS. 5 and 6, the coupler 54 comprises a first end 58, a second 60, and a corrugated portion 62 between the first end 58 and the second end 60. The coupler 54, which may be a one piece member formed from metal, such as aluminum for example, comprises a general cylindrical shape having an opening 64 extending therethrough. The corrugated portion 62 may comprise a plurality of collapsible ribs 66. However, any suitable configuration and/or material may be provided. The seals 56 may be sized and shaped to have a general washer type configuration, and may be formed from an elastomer material such as neoprene rubber, for example. However, in alternate embodiments, the seal members 56 may comprise any suitable configuration and/or material. Additionally, alternate embodiments may not comprise any seal members.

Referring now also to FIGS. 7-10, one method of attaching the connector 16 to the cable 14 will be described. It should be noted that the method described below is merely exemplary and any suitable method or variation may be performed. For example, one similar method of attaching the connector to a cable is described in U.S. Pat. No. 7,575,485 which is hereby incorporated by reference in its entirety.

Figure 7:
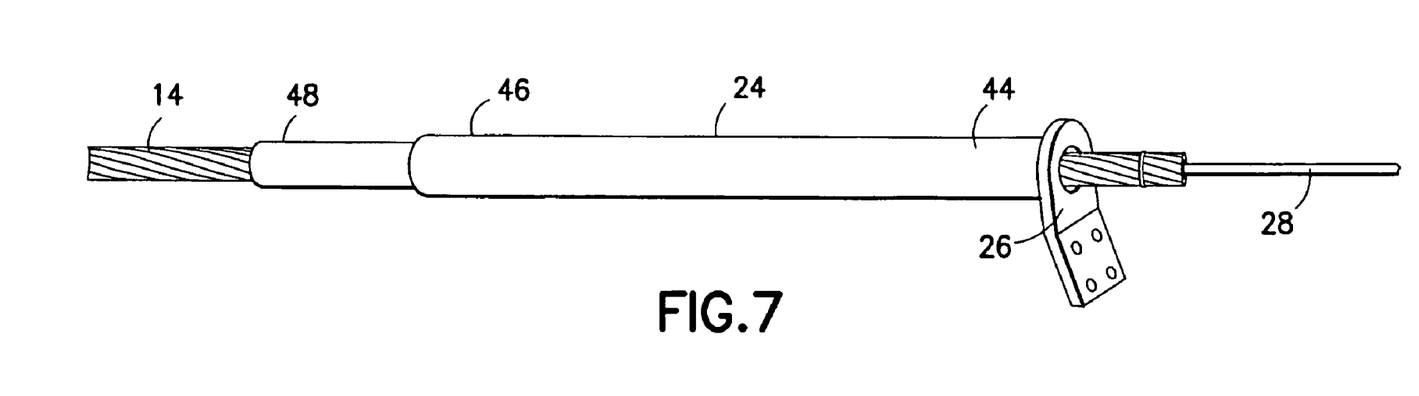
FIG. 7 is a side view of an outer sleeve and inner sleeve of the connector assembly of FIG. 2 located on a cable during assembly.

As seen in FIG. 7, the inner sleeve 48 may be installed or slid over the cable 14. The outer sleeve 24 may then be slid over the cable 14. The wire strands 30 of the cable 14 are cut to expose a length of the core 28. With the cable 14 and sleeves 24, 48 in this position, the cable and sleeves are ready for installation with the rest of the assembly.

At this point, the coupler assembly 52 may be provided over the exposed core 28 and cable 14 wherein the core 28 and the cable 14 extend through the openings of the coupler 54 and the seals 56. The coupler assembly may then be slid or moved towards the outer tube member 24 (proximate the pad portion 26).

Figure 8:
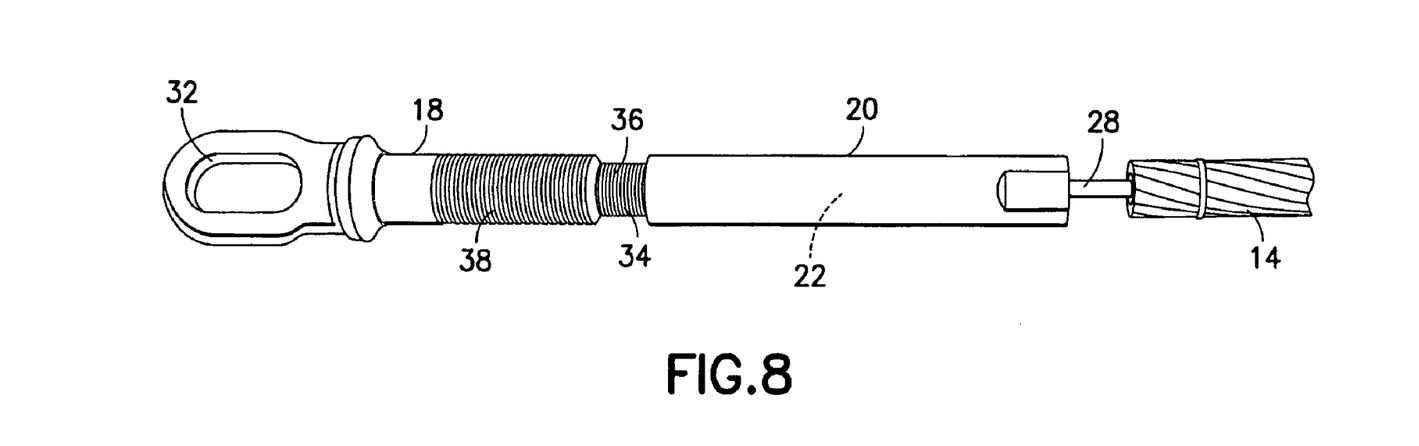
FIG. 8 is side view of a wedge sleeve and dead end connector member of the connector assembly of FIG. 2 located on the cable during assembly.

As seen in FIG. 8, the wedge sleeve 20 is located over the exposed end of the core 28 and the wedges 22 are inserted into the wedge sleeve 20 with the exposed core 28 being located between the wedges 22. It should be noted that, for the purposes of clarity, the coupler assembly 52 is not shown in FIG. 8.

The wedge sleeve 20 may then be pulled or slid towards the dead end connector member 18. This may, for example, help to push the wedges 22 inside the wedge sleeve 20 and readies the assembly for threading of the wedge sleeve to the threaded section 36 of the dead end connector member 18. The dead end connector member 18 can then be screwed together with the wedge sleeve 20 at the respective threaded sections 36, 42. This tightens the dead end connector member 18 to the wedge sleeve 20 to set the wedges 22.

The outer sleeve 24 and inner sleeve 48 can be slid toward the dead end connector member 18, with the outer sleeve 24 stopping against the coupler assembly (as seen in FIG. 4). In this position, the coupler 54 is configured to receive the shaft portion 37 of the connector member 18 at the opening 64. The front end 46 of the outer sleeve 24 may then be crimped onto the inner tube member (and over the wires 30 of the cable 14). The crimping process, which may be referred to as reverse (or back) crimping, may comprise starting to crimp the outer tube member at the front end 46, and sequentially crimp towards the opposite end 44 (proximate the dead end connector member 18), see direction 72 in FIG. 2, for example. After the crimping is performed over the inner tube member (for example see FIG. 2), more crimping may be performed proximate the end 44 of the outer tube member 24 (wherein the tube member 24 us crimped onto the rib section 38 of the connector member 18).

Figure 9:
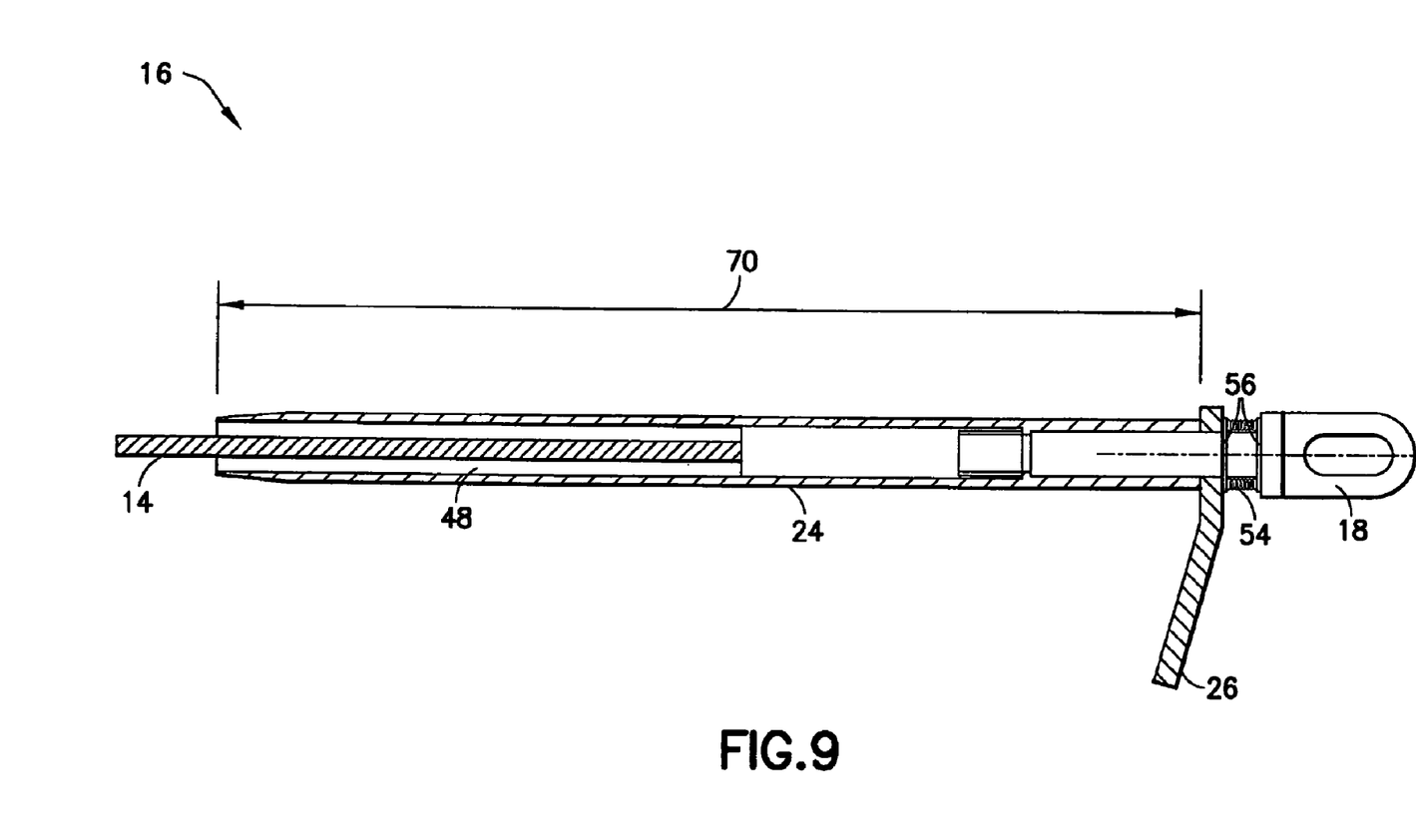
FIG. 9 is a side section view of the electrical cable connector assembly (after to crimping) shown in FIG. 2.
Figure 10:
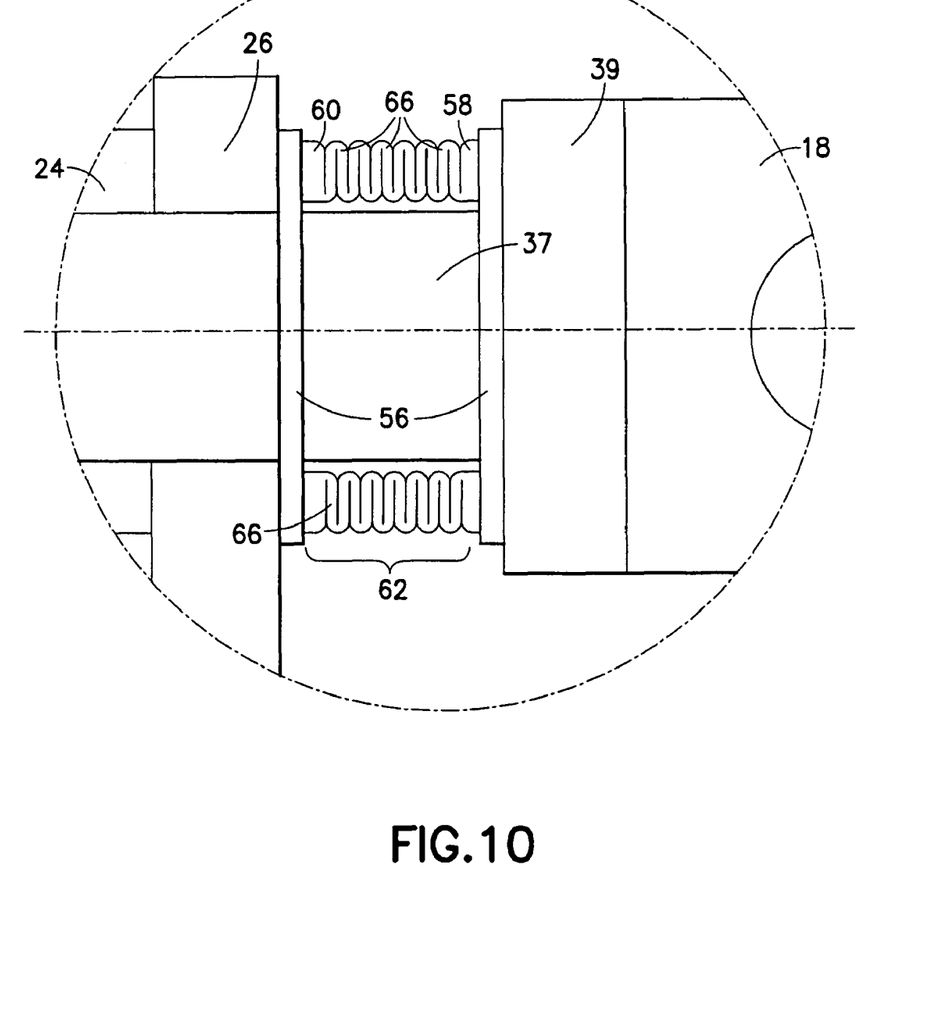
FIG. 10 is an enlarged view of the compressed/collapsed coupler of the connector assembly shown in FIG. 9.

As the material of the outer tube member 24 is being crimped, the outer tube member axially expands (from a length 68 in FIG. 4 to a length 70 in FIG. 9) and applies a constant force the end 60 (with the seal 56 therebetween) of the collapsible coupler 54. The ribs 66 are designed to have a very thin wall which allows the coupler to collapse as pressure is applied. For example, the coupler may collapse as shown in FIGS. 9 and 10. According to one example of the invention, the length of the outer tube member may increase from about 25.50 inches to about 28.00 inches during the crimping process, wherein the corrugated portion of the coupler decreases in length (or collapses) in the amount of about 2.50 inches. It should be noted that the dimensions provided above are for exemplary non-limiting purposes only, and any suitable configuration providing other suitable dimensions may be provided.

This completes assembly of the electrical connector 16 with the cable 14. The outer sleeve 24 may provide an electrical connection of the wires to another member. The connector member 18, wedge sleeve 20 and wedges 22 may provide a mechanical connection of the core 28 to another member.

Although the figures and discussion have been with respect to a dead end connector, it should be understood that the coupler assembly 52 may be provided for use in other suitable type of connector. For example, the coupler assembly 52 may be used with, for example, a splice electrical connector.

Various exemplary embodiments of the invention provide significant advantages over conventional configurations which begin crimping the outer tube member by starting from the back (proximate the dead end connector member) and continue to crimp toward the front (proximate the inner tube member and the cable). Embodiments of the invention alleviate or prevent "bird caging" from occurring by reverse (back) crimping. The reverse crimping procedure, as described above (crimping starting from the [front] end 46 of the member 24 and continued toward the [back] end 44 of the member 24) may, for example, "push" the material towards the (back) end (the eyebolt 18 end). Conventional configurations, on the other hand, have no space to allow for the expansion of the material.

The technical effects of the any one or more of the exemplary embodiments of the invention provide for a collapsible coupler which allows for the expansion of the material. Embodiments of the invention may includes a spacer (having a series of ribs that collapse [similar to an accordion, for example] when pressure is applied to the ends) that compresses as the connector becomes elongated during crimping. As the coupler (or spacer) collapses, this provides a space to accommodate for the expansion of the material to help to prevent "bird caging" of the cable.

According to another example of the invention, a method of manufacturing an electrical connector is disclosed. The method includes the following steps. Providing a first electrical connector member comprising a flange portion and a shaft portion. Providing a second electrical connector member comprising a pad portion and a tube portion, wherein the tube portion is adapted to receive the shaft portion, and wherein the tube portion is adapted to be attached to the electrical connector by a crimping operation. Providing an electrical connector coupler comprising a first end, a second end, and a corrugated portion between the first end and the second end, wherein the first end is adapted to be disposed proximate the flange portion, wherein the second end is adapted to be disposed proximate the pad portion, and wherein the corrugated portion is adapted to collapse when the tube portion of the second electrical connector member is crimped on to the electrical connector. It should be noted that any of the above steps may be performed alone or in combination with one or more of the steps.

According to another example of the invention, a method of connecting an electrical connector to an electrical conductor is disclosed. The method includes the following steps. Providing a corrugated electrical connector coupler on a first electrical connector member. Connecting the electrical conductor to the first electrical connector member. Installing a second electrical connector member over the electrical conductor and a shaft portion of the first electrical connector member. Crimping a portion of the second electrical connector member. Collapsing the corrugated electrical connector coupler between the first electrical connector member and the second electrical connector member, wherein the shaft portion of the first electrical connector member extends through an opening of the corrugated electrical connector coupler. It should be noted that any of the above steps may be performed alone or in combination with one or more of the steps.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

(1) In one exemplary embodiment, an electrical connector comprising: a first electrical connector member comprising a flange portion and a shaft portion; a second electrical connector member comprising a pad portion and a tube portion, wherein the tube portion is adapted to receive the shaft portion of the first electrical connector member, and wherein the tube portion is adapted to be attached to another portion of the electrical connector by a crimping operation; and an electrical connector coupler comprising a first end, a second end, and a corrugated portion between the first end and the second end, wherein the first end is adapted to be disposed proximate the flange portion, wherein the second end is adapted to be disposed proximate the pad portion, and wherein the electrical connector coupler is adapted to be compressed from a first length to a second different length in response to the crimping operation.

An electrical connector as above, wherein the corrugated portion comprises a plurality of collapsible ribs.

An electrical connector as above, further comprising a first seal between the first end and the flange portion.

An electrical connector as above, further comprising a second seal between the second end and the pad portion.

An electrical connector as above, wherein the corrugated portion comprises a plurality of collapsible ribs, and wherein the electrical connector further comprises a first seal between the first end and the flange portion.

An electrical connector as above, further comprising a second seal between the second end and the pad portion.

An electrical connector as above, wherein the first electrical connector member is an electrical connector dead end member, and wherein the second electrical connector member is an outer tube member.

An electrical connector as above, wherein the another portion of the electrical connector comprises an inner tube member.

An electrical connector as above, wherein the another portion of the electrical connector comprises a section of the shaft portion.

An electrical connector as above, wherein the electrical connector coupler comprises a one piece member formed from aluminum.

(2) In another exemplary embodiment, an electrical connector comprising: an electrical connector dead end member comprising a looped end portion and a shaft portion; an outer tube member located around the shaft portion of the electrical connector dead end member; a wedge sleeve member connected to the electrical connector dead end member, wherein the wedge sleeve is adapted to have an electrical conductor extend through at least a portion thereof; an inner tube member adjacent the wedge sleeve member, wherein the inner tube member is adapted to be between the electrical conductor and the outer tube member; and an electrical connector coupler between the looped end portion and the outer tube member, wherein the electrical connector coupler comprises a plurality of collapsible ribs, and wherein the plurality of collapsible ribs are adapted to collapse when the outer tube member is attached to the inner tube member.

An electrical connector as above, wherein the plurality of collapsible ribs are adapted to collapse when the outer tube member is crimped on to the inner tube member.

An electrical connector as above, further comprising a first seal member between the electrical connector coupler and the electrical connector dead end member.

An electrical connector as above, further comprising a second seal member between the electrical connector coupler and the outer tube member.

An electrical connector as above, wherein the first seal member and the second seal member are each one piece members comprising an elastomer material.

An electrical connector as above, wherein the electrical connector coupler comprises a one piece member formed from metal.

An electrical connector as above, wherein the outer tube member is adapted to axially expand when the outer tube member is attached to the inner tube member, and wherein the plurality of collapsible ribs are adapted to collapse in response to the outer tube member axially expanding.

An electrical connector as above, wherein the outer tube member is adapted to apply a force to an end of the electrical connector coupler when the outer tube member axially expands.

An electrical connector as above, wherein the outer tube member is crimped onto the shaft portion.

An electrical connector as above, wherein the shaft portion extends through an opening of the electrical connector coupler.

(3) In another exemplary embodiment, a method of manufacturing an electrical connector comprising: providing a first electrical connector member comprising a flange portion and a shaft portion; providing a second electrical connector member comprising a pad portion and a tube portion, wherein the tube portion is adapted to receive the shaft portion, and wherein the tube portion is adapted to be attached to the electrical connector by a crimping operation; and providing an electrical connector coupler comprising a first end, a second end, and a corrugated portion between the first end and the second end, wherein the first end is adapted to be disposed proximate the flange portion, wherein the second end is adapted to be disposed proximate the pad portion, and wherein the corrugated portion is adapted to collapse when the tube portion of the second electrical connector member is crimped on to the electrical connector.

A method as above, further comprising providing a first seal member adapted to be disposed between the first end and the flange portion.

A method as above, further comprising providing a second seal member adapted to be disposed between the second end and the pad portion.

A method as above, wherein the providing of the first electrical connector member further comprises providing an electrical connector dead end eyebolt member, and wherein the providing of the second electrical connector member further comprises providing an outer tube member.

A method as above, wherein the corrugated portion comprises a plurality of ribs adapted to collapse when the tube portion expands in response to the crimping of the second electrical connector member.

(4) In another exemplary embodiment, a method of connecting an electrical connector to an electrical conductor comprising: providing a corrugated electrical connector coupler on a first electrical connector member; connecting the electrical conductor to the first electrical connector member; installing a second electrical connector member over the electrical conductor and a shaft portion of the first electrical connector member; crimping a portion of the second electrical connector member; and collapsing the corrugated electrical connector coupler between the first electrical connector member and the second electrical connector member, wherein the shaft portion of the first electrical connector member extends through an opening of the corrugated electrical connector coupler.

A method as above, further comprising installing a first seal member between the corrugated electrical connector coupler and the first electrical connector member.

A method as above, further comprising installing a second seal member between the corrugated electrical connector coupler and the second electrical connector member.

A method as above, further comprising providing an inner tube member between the electrical conductor and the second electrical connector member.

A method as above, wherein the crimping of the portion of the second electrical connector member further comprises crimping an outer tube portion of the second electrical connector member on to the inner tube member.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electrical connector comprising:
   a first electrical connector member comprising a flange portion and a shaft portion;
   a second electrical connector member comprising a pad portion and a tube portion, wherein the tube portion is adapted to receive the shaft portion of the first electrical connector member, and wherein the tube portion is adapted to be attached to another portion of the electrical connector by a crimping operation; and
   an electrical connector coupler comprising a first end, a second end, and a corrugated portion between the first end and the second end, wherein the first end is adapted to be disposed proximate the flange portion, wherein the second end is adapted to be disposed proximate the pad portion, and wherein the electrical connector coupler is adapted to be compressed from a first length to a second different length in response to the crimping operation.

2. An electrical connector as in claim 1 wherein the corrugated portion comprises a plurality of collapsible ribs.

3. An electrical connector as in claim 1 further comprising a first seal between the first end and the flange portion.

4. An electrical connector as in claim 1 further comprising a second seal between the second end and the pad portion.

5. An electrical connector as in claim 1 wherein the corrugated portion comprises a plurality of collapsible ribs, and wherein the electrical connector further comprises a first seal between the first end and the flange portion.

6. An electrical connector as in claim 5 further comprising a second seal between the second end and the pad portion.

7. An electrical connector as in claim 6 wherein the first electrical connector member is an electrical connector dead end member, and wherein the second electrical connector member is an outer tube member.

8. An electrical connector as in claim 1 wherein the another portion of the electrical connector comprises an inner tube member.

9. An electrical connector as in claim 1 wherein the another portion of the electrical connector comprises a section of the shaft portion.

10. An electrical connector as in claim 1 wherein the electrical connector coupler comprises a one piece member formed from aluminum.

11. An electrical connector comprising:
    an electrical connector dead end member comprising a looped end portion and a shaft portion;
    an outer tube member located around the shaft portion of the electrical connector dead end member;
    a wedge sleeve member connected to the electrical connector dead end member, wherein the wedge sleeve is adapted to have an electrical conductor extend through at least a portion thereof;
    an inner tube member adjacent the wedge sleeve member, wherein the inner tube member is adapted to be between the electrical conductor and the outer tube member; and
    an electrical connector coupler between the looped end portion and the outer tube member, wherein the electrical connector coupler comprises a plurality of collapsible ribs, and wherein the plurality of collapsible ribs are adapted to collapse when the outer tube member is attached to the inner tube member.

12. An electrical connector as in claim 11 wherein the plurality of collapsible ribs are adapted to collapse when the outer tube member is crimped on to the inner tube member.

13. An electrical connector as in claim 11 further comprising a first seal member between the electrical connector coupler and the electrical connector dead end member.

14. An electrical connector as in claim 13 further comprising a second seal member between the electrical connector coupler and the outer tube member.

15. An electrical connector as in claim 14 wherein the first seal member and the second seal member are each one piece members comprising an elastomer material.

16. An electrical connector as in claim 11 wherein the electrical connector coupler comprises a one piece member formed from metal.

17. An electrical connector as in claim 11 wherein the outer tube member is adapted to axially expand when the outer tube member is attached to the inner tube member, and wherein the plurality of collapsible ribs are adapted to collapse in response to the outer tube member axially expanding.

18. An electrical connector as in claim 17 wherein the outer tube member is adapted to apply a force to an end of the electrical connector coupler when the outer tube member axially expands.

19. An electrical connector as in claim 11 wherein the outer tube member is crimped onto the shaft portion.

20. An electrical connector as in claim 11 wherein the shaft portion extends through an opening of the electrical connector coupler.

21. A method of manufacturing an electrical connector comprising:
    providing a first electrical connector member comprising a flange portion and a shaft portion;
    providing a second electrical connector member comprising a pad portion and a tube portion, wherein the tube portion is adapted to receive the shaft portion, and wherein the tube portion is adapted to be attached to the electrical connector by a crimping operation; and
    providing an electrical connector coupler comprising a first end, a second end, and a corrugated portion between the first end and the second end, wherein the first end is adapted to be disposed proximate the flange portion, wherein the second end is adapted to be disposed proximate the pad portion, and wherein the corrugated portion is adapted to collapse when the tube portion of the second electrical connector member is crimped on to the electrical connector.

22. A method as in claim 21 further comprising providing a first seal member adapted to be disposed between the first end and the flange portion.

23. A method as in claim 22 further comprising providing a second seal member adapted to be disposed between the second end and the pad portion.

24. A method as in claim 21 wherein the providing of the first electrical connector member further comprises providing an electrical connector dead end eyebolt member, and wherein the providing of the second electrical connector member further comprises providing an outer tube member.

25. A method as in claim 21 wherein the corrugated portion comprises a plurality of ribs adapted to collapse when the tube portion expands in response to the crimping of the second electrical connector member.

26. A method of connecting an electrical connector to an electrical conductor comprising:
    providing a corrugated electrical connector coupler on a first electrical connector member;
    connecting the electrical conductor to the first electrical connector member;
    installing a second electrical connector member over the electrical conductor and a shaft portion of the first electrical connector member;
    crimping a portion of the second electrical connector member; and collapsing the corrugated electrical connector coupler between the first electrical connector member and the second electrical connector member, wherein the shaft portion of the first electrical connector member extends through an opening of the corrugated electrical connector coupler.

27. A method as in claim 26 further comprising installing a first seal member between the corrugated electrical connector coupler and the first electrical connector member.

28. A method as in claim 26 further comprising installing a second seal member between the corrugated electrical connector coupler and the second electrical connector member.

29. A method as in claim 26 further comprising providing an inner tube member between the electrical conductor and the second electrical connector member.

30. A method as in claim 29 wherein the crimping of the portion of the second electrical connector member further comprises crimping an outer tube portion of the second electrical connector member on to the inner tube member.

* * * * *